(12) United States Patent
D'Agostini

(10) Patent No.: US 9,709,269 B2
(45) Date of Patent: Jul. 18, 2017

(54) SOLID FUEL BURNER

(71) Applicant: AIR PRODUCTS AND CHEMICALS, INC., Allentown, PA (US)

(72) Inventor: Mark Daniel D'Agostini, Allentown, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 598 days.

(21) Appl. No.: 14/224,812

(22) Filed: Mar. 25, 2014

(65) Prior Publication Data

US 2015/0192296 A1 Jul. 9, 2015

Related U.S. Application Data

(60) Provisional application No. 61/924,272, filed on Jan. 7, 2014.

(51) Int. Cl.
  *F23L 7/00* (2006.01)
  *F23D 1/00* (2006.01)

(52) U.S. Cl.
  CPC .......... *F23L 7/007* (2013.01); *F23D 1/00* (2013.01); *F23D 2201/20* (2013.01); *Y02E 20/344* (2013.01)

(58) Field of Classification Search
  CPC ... F23D 1/00; F23D 1/005; F23D 1/04; F23D 1/06; F23D 2201/00; F23D 2201/10; F23D 2201/101; F23D 2201/20; F23D 2201/30
  (Continued)

(56) References Cited

U.S. PATENT DOCUMENTS 3,894,834 A 7/1975 Estes
4,356,975 A * 11/1982 Chadshay .............. F23D 1/00
   239/419.5
(Continued)

FOREIGN PATENT DOCUMENTS

CN   1098489 A   2/1995
CN   1386180     12/2002
(Continued)

OTHER PUBLICATIONS

Howard, J. H. G., "Performance and Flow Regimes for Annular Diffusers", The American Society of Mechanical Engineers, an ASME publication, pp. 1-11.
(Continued)

*Primary Examiner* — David J Laux
(74) *Attorney, Agent, or Firm* — Larry S. Zelson

(57) ABSTRACT

A solid fuel/oxygen burner including an upstream section, an intermediary section, and a downstream section, a solid fuel conduit extending through the intermediary and downstream sections for transporting a mixture of solid fuel in a transport gas, the solid fuel conduit having a greater cross-sectional area in the downstream section than in the intermediary section, and a tubular fuel separator positioned within the solid fuel conduit in the downstream section, the fuel separator being bounded by an inlet plane and a outlet plane, the fuel separator dividing the fuel conduit into an inner nozzle having a cross-sectional area and an outer annular nozzle having a cross-sectional area, wherein the ratio of the outer nozzle cross-sectional area to the inner nozzle cross-sectional area measured at the outlet plane is greater than 1.

14 Claims, 11 Drawing Sheets

View B-B

(58) Field of Classification Search
USPC .................................................. 110/104 B
See application file for complete search history.

(56) References Cited

U.S. PATENT DOCUMENTS

| | | | |
|---|---|---|---|
| 4,928,605 A | 5/1990 | Suwa et al. | |
| 5,611,682 A | 3/1997 | Slavejkov et al. | |
| 5,643,348 A * | 7/1997 | Shamp | C03B 5/2353 432/196 |
| 5,685,242 A * | 11/1997 | Narato | F23C 6/047 110/104 B |
| 5,937,770 A * | 8/1999 | Kobayashi | F23D 1/00 110/104 B |
| 6,089,171 A | 7/2000 | Fong et al. | |
| 6,113,389 A | 9/2000 | Joshi et al. | |
| 6,116,171 A | 9/2000 | Oota et al. | |
| 6,367,394 B1 | 4/2002 | Kaneko et al. | |
| 6,439,136 B1 | 8/2002 | Mann et al. | |
| 6,752,620 B2 | 6/2004 | Heier et al. | |
| 6,843,185 B1 | 1/2005 | Taylor | |
| 7,390,189 B2 | 6/2008 | D'Agostini | |
| 7,717,701 B2 | 5/2010 | D'Agostini et al. | |
| 2003/0075843 A1 | 4/2003 | Wunsche | |
| 2004/0211345 A1 | 10/2004 | Okazaki et al. | |
| 2004/0261671 A1 * | 12/2004 | Taylor | F23C 9/003 110/261 |
| 2005/0120927 A1 * | 6/2005 | Okazaki | F23D 1/00 110/261 |
| 2006/0057517 A1 | 3/2006 | Joshi et al. | |
| 2008/0184919 A1 | 8/2008 | D'Agostini et al. | |
| 2009/0277364 A1 * | 11/2009 | Donais | F23C 7/008 110/263 |
| 2010/0018445 A1 | 1/2010 | Li et al. | |
| 2010/0154689 A1 | 6/2010 | Adam et al. | |
| 2010/0162930 A1 * | 7/2010 | Okazaki | F23C 7/008 110/190 |
| 2012/0210917 A1 | 8/2012 | Belasse et al. | |
| 2013/0291772 A1 * | 11/2013 | Mine | F23C 9/003 110/347 |
| 2014/0305356 A1 | 10/2014 | D'Agostini et al. | |

FOREIGN PATENT DOCUMENTS

| | | |
|---|---|---|
| CN | 1551964 A | 12/2004 |
| CN | 202284791 | 6/2012 |
| CN | 202371711 | 8/2012 |
| CN | 102679338 A | 9/2012 |
| CN | 204026656 U | 12/2014 |
| CN | 204026657 | 12/2014 |
| EP | 1312859 | 11/2007 |
| JP | 2000356309 A | 12/2000 |
| JP | 2005024136 A2 | 1/2005 |
| JP | 200979794 | 4/2009 |
| KR | 10-0201677 | 6/1999 |
| KR | 200000023593 A | 4/2000 |
| KR | 20030040183 | 5/2003 |
| TW | 313247 A | 11/1997 |
| WO | 2013097165 A1 | 7/2013 |

OTHER PUBLICATIONS

Rao, D. M., "A Method of Flow Stabilisation with High Pressure Recovery in Short, Conical Diffusers", Technical Notes, The Aeronautical Journal of the Royal Aeronautical Society, May 1971, vol. 75, pp. 330, 337-339.

Rao, Dhanvada M., "Application of Radial-Splitters for Improved Wide-Angle Diffuser Performance in Blowdown Tunnel", National Aeronautical Laboratory, Bangalore, India, J. Aircraft, vol. 13, No. 7, pp. 538-540.

Reneau, L. R., "Performance and Design of Straight, Two-Dimensional Diffusers", Journal of Basic Engineering, Mar. 1967, pp. 141-150.

* cited by examiner

Section A-A

View B-B

SOLID FUEL BURNER

BACKGROUND

This application relates to a burner for combustion of solid fuel with oxygen.

Due in part to its variable volatile matter content, solid fuel can be a very difficult fuel to ignite in a flowing stream. Hence, typically the solid fuel undergoes a significant ignition delay that results in a flame front which is substantially detached from the fuel nozzle. This is an inherently unstable situation that can lead to high levels of unburned carbon, unstable process heating conditions (heat transfer, melting, etc.) and, potentially, blow-off of the flame that can lead to a very rapid and unsafe degradation in combustion.

It is desirable to have a burner capable of forming of a solid fuel flame front that is attached to the burner tip. This is an inherently desirable condition that maximizes heat transfer, carbon burnout and flame stability.

SUMMARY

An embodiment of an oxy-solid fuel burner is described having an upstream section, an intermediary section, and a downstream section. A solid fuel conduit extends through the intermediary and downstream sections for transporting a mixture of solid fuel in a transport gas, the solid fuel conduit having a greater cross-sectional area in the downstream section than in the intermediary section. A tubular fuel separator is positioned within the solid fuel conduit in the downstream section, the fuel separator being bounded by an inlet plane and a outlet plane, the fuel separator dividing the fuel conduit into an inner nozzle having a cross-sectional area and an outer annular nozzle having a cross-sectional area, wherein the ratio of the outer nozzle cross-sectional area to the inner nozzle cross-sectional area measured at the outlet plane is greater than 1.

In another aspect, the burner may further include at least one fuel wedge positioned within the outer nozzle, the fuel wedge having an upstream apex and a downstream base aligned with the outlet plane of the fuel separator. Preferably, at least two and no more than six of the fuel wedges are positioned within the outer nozzle.

In another aspect, an annular oxygen conduit surrounds the solid fuel conduit in at least the intermediary section.

In another aspect, the burner may further include at least one oxygen wedge extending radially outward from the annular solid fuel conduit in the downstream section, the oxygen wedge having an upstream apex and a downstream base aligned with the outlet plane of the fuel separator. The oxygen wedge may be one continuous wedge circumscribing the annular solid fuel conduit.

In another aspect, the burner may further include a main fuel conduit in the upstream section of the burner for flowing solid fuel and a primary transport gas to the solid fuel conduit in the intermediary section of the burner, wherein the intermediary section and the downstream section are coaxial and define a burner axis, and the upstream section defines a solid fuel inlet axis that is offset from the burner axis by an angle from about 30° to about 60°. In a variation, the burner may further include a tubular solid fuel and primary transport gas conduit extending into and surrounded by the main fuel conduit along the solid fuel inlet axis, the tubular solid fuel and primary transport gas conduit having an inlet for providing solid fuel and the primary transport gas to the burner, and a supplemental transport gas inlet to provide supplemental transport gas to the main fuel conduit.

In another aspect, the ratio of the outer nozzle cross-sectional area to the inner nozzle cross-sectional area measured at the outlet plane is from about 1.5 to about 6.

In another aspect, the burner further includes a fuel trip disk positioned symmetrically about the burner axis and upstream of the inlet plane of the fuel separator by a longitudinal distance, the fuel trip disk having a radial height. Preferably, the longitudinal distance between the fuel trip disk and the inlet plane of the fuel separator is from about 2 to about 5 times the radial height of the fuel trip disk. The inner annular nozzle formed by the fuel separator has a radial height at the inlet plane, and preferably, the radial height of the trip disk is from about 0.25 to about 0.5 times the radial height of the inner annular nozzle. In one variation, the fuel separator is generally cylindrical in shape. In another variation, the fuel separator is generally converging truncated conical in shape. In yet another variation, the fuel separator includes a generally cylindrical upstream portion and a generally converging truncated conical downstream portion.

A method of combusting solid fuel and oxygen is described using a burner, the method including providing sufficient supplemental transport gas to increase the oxygen concentration of the mixture of solid fuel and transport gas to greater than about 21 mol % and less than or equal to about 50 mol %. In one aspect of the method of combusting, the oxygen concentration of the mixture of solid fuel and transport gas is raised by the supplemental transport gas to greater than about 21 mol % and less than or equal to about 35 mol %.

A method of operating a regenerative air-fuel glass melting furnace is provided using a burner, the furnace having a hot air port, the method including positioning at least one of the burner near the hot air port. The method may further include operating the burner with sub-stoichiometric oxygen. In one aspect of the method of operating, the stoichiometric ratio is from about 0.1 to about 0.5.

A regenerative furnace is described including a burner block having at least one firing port mounted in a sidewall of the furnace and one or more solid fuel/oxygen burners positioned near an edge of the at least one firing port. The burner includes an upstream section, an intermediary section, and a downstream section; a solid fuel conduit extending through the intermediary and downstream sections for transporting a mixture of solid fuel in a transport gas, the solid fuel conduit having a greater cross-sectional area in the downstream section than in the intermediary section; and a tubular fuel separator positioned within the solid fuel conduit in the downstream section, the fuel separator being bounded by an inlet plane and a outlet plane, the fuel separator dividing the fuel conduit into an inner nozzle having a cross-sectional area and an outer annular nozzle having a cross-sectional area, wherein the ratio of the outer nozzle cross-sectional area to the inner nozzle cross-sectional area measured at the outlet plane is greater than 1.

DETAILED DESCRIPTION

Figure 1:
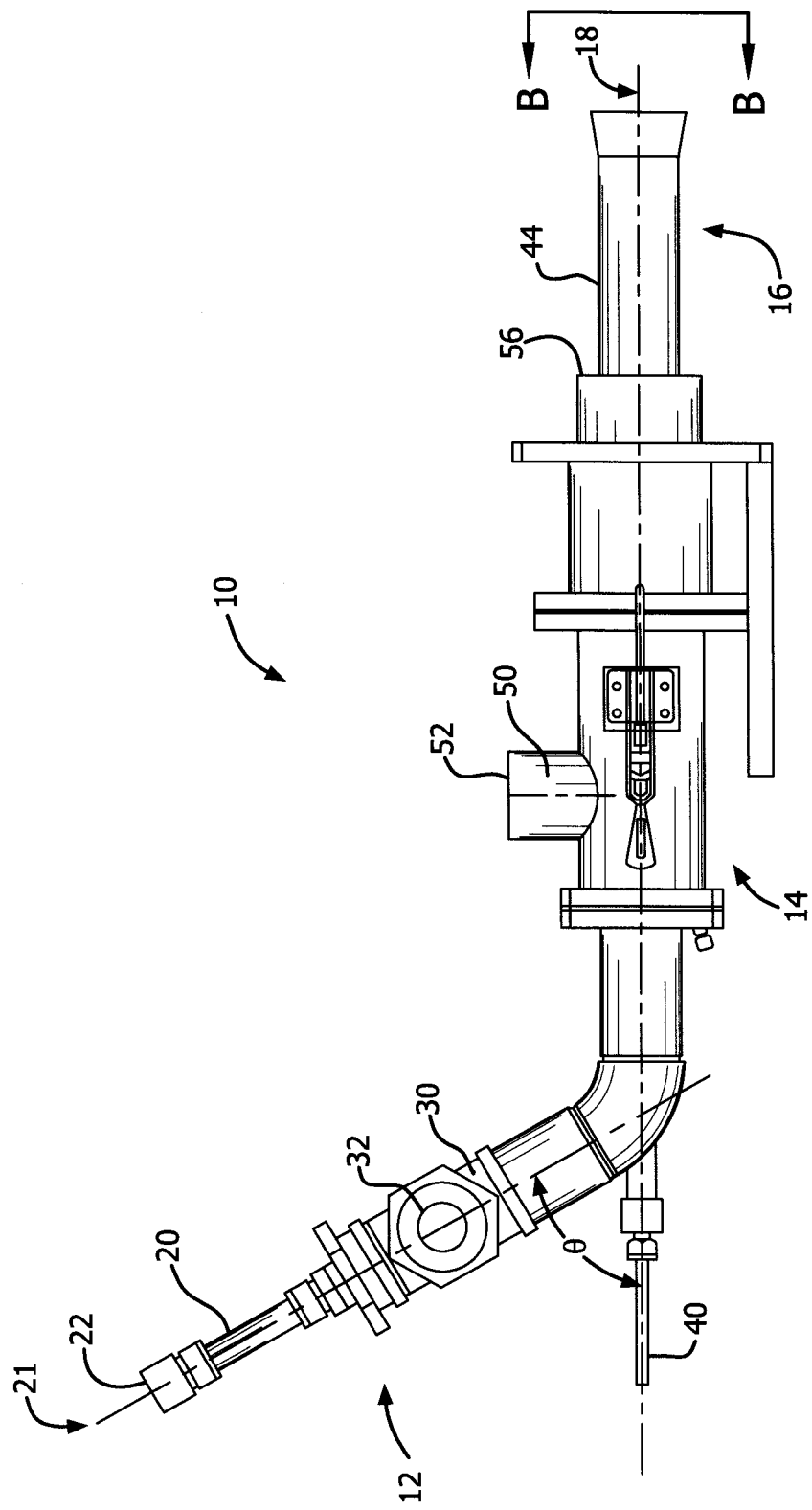
FIG. 1 is a side view of an exemplary embodiment of an oxy-solid fuel burner.

For the purposes of the description herein, the following definitions are provided. Transport gas is a gaseous fluid used to carry or transport solid fuel particles to and through the burner, and may comprise air, oxygen-enriched air, nitrogen, carbon dioxide, recycled flue gas, and combinations thereof. Supplemental transport gas is a gaseous fluid used to increase the flow rate of transport gas within the burner, and may comprise air, oxygen-enriched air, nitrogen, carbon dioxide, recycled flue gas, and combinations thereof. Oxygen is a gas containing oxygen molecules at a concentration greater than or equal to 28 mol % O2, preferably greater than or equal to 60 mol % O2, and more preferably greater than or equal to 85 mol % O2. Solid fuel is a carbon or hydrocarbon fuel in solid form and may comprise petroleum coke; all varieties of coal including anthracite, bituminous, sub-bituminous, and lignite; peat, wood, grass, and other so-called biomass materials; municipal solid waste; and combinations thereof. Finally, as employed herein, the term "bluff" signifies a structure whose dimensions in a plane perpendicular to the principal flow direction are comparable in magnitude to its dimension along the principal flow direction.

One embodiment of an oxygen/pulverized solid fuel burner 10 is illustrated in FIGS. 1 through 6. The burner 10 includes an upstream section 12, an intermediary section 14, and a downstream section 16.

The upstream section 12 includes a tubular solid fuel conduit 20 for transporting pulverized solid fuel and (primary) transport gas. The solid fuel conduit has an inlet 22. The upstream section 12 optionally further includes a main fuel conduit 30 surrounding the solid fuel conduit 20 to form an annular supplemental transport gas passage 34 around the solid fuel conduit 20. The main fuel conduit 30 has a supplemental transport gas inlet 32. The solid fuel conduit 20 terminates at a downstream end 24 within the main fuel conduit 30 at a plenum or mixing region 26 in which the solid fuel and primary transport gas are mixed with the supplemental transport gas before flowing into the intermediary section 14.

Figure 2:
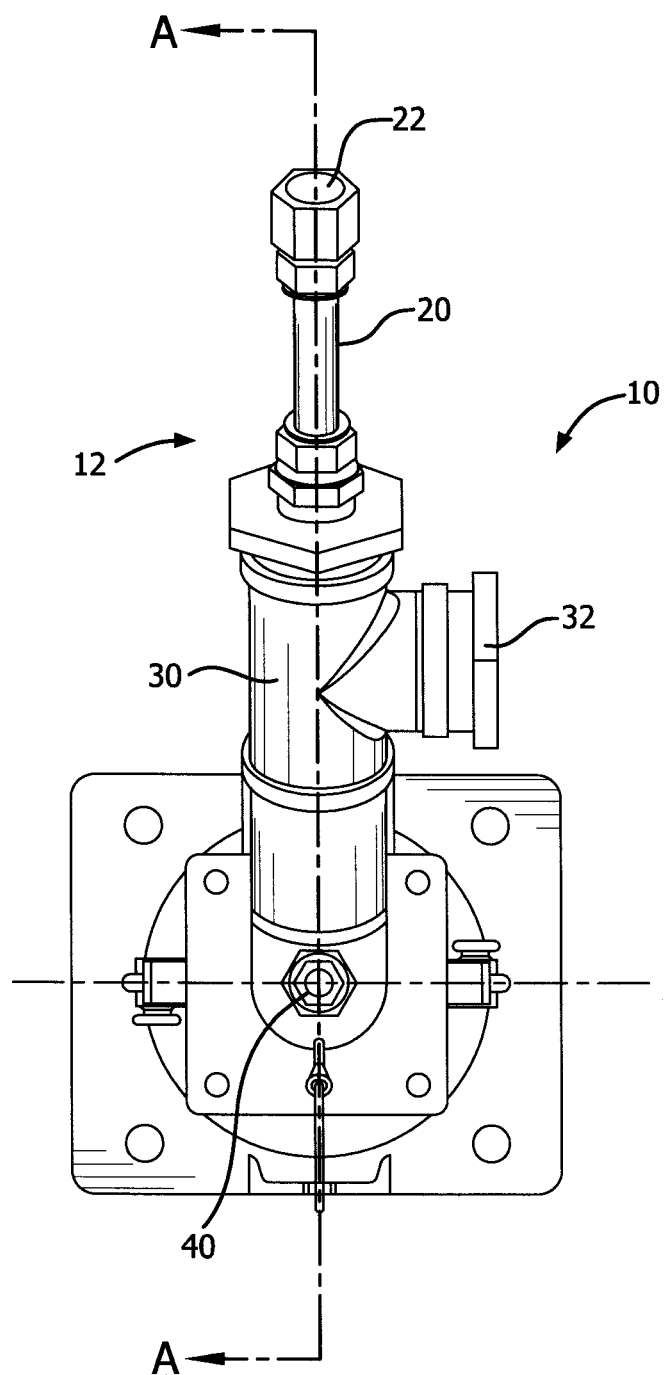
FIG. 2 is a rear view of the embodiment of the oxy-solid fuel burner shown in FIG. 1.
Figure 3:
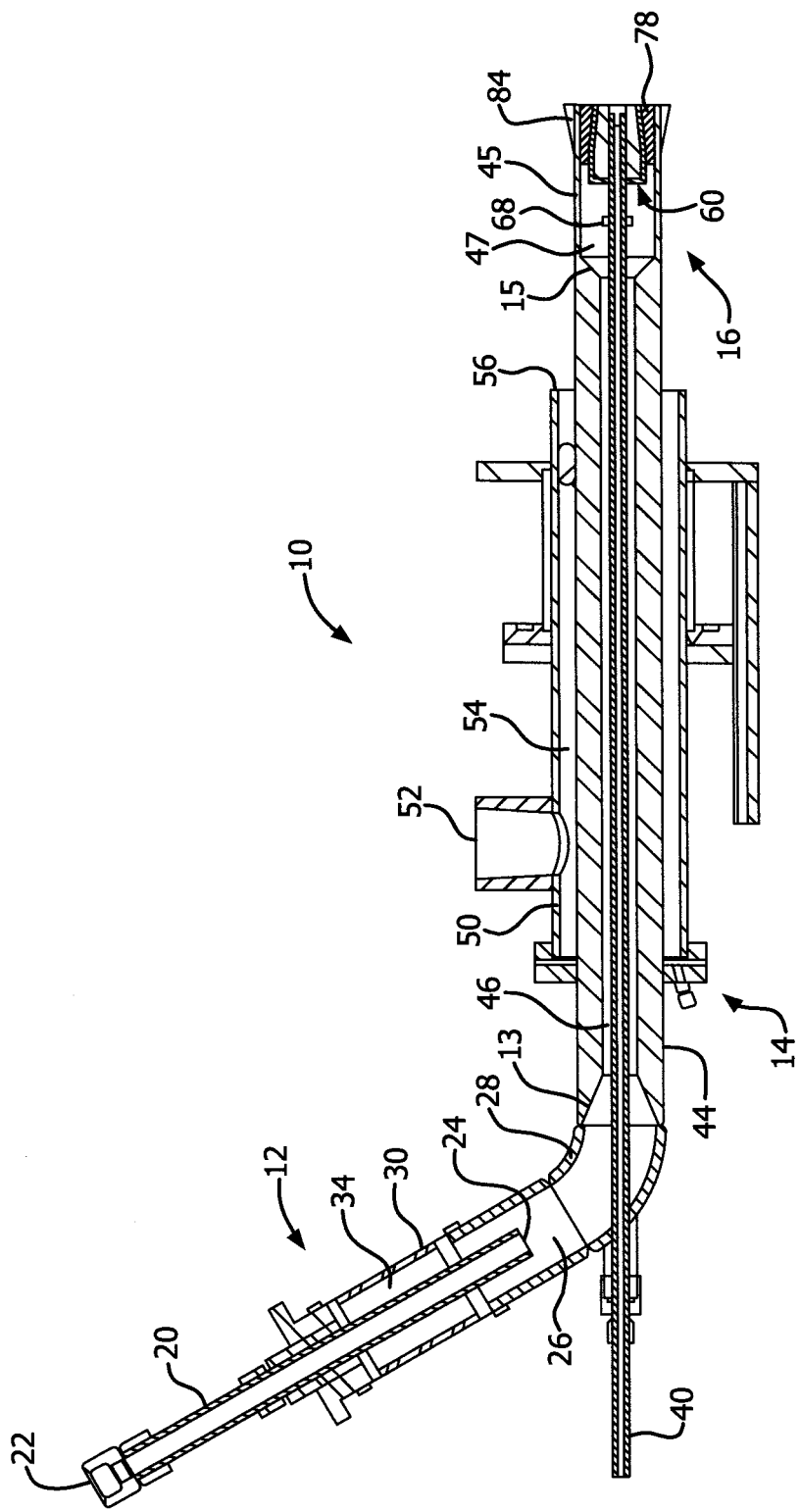
FIG. 3 is a cross-sectional view of the burner embodiment shown in FIG. 2, taken through section A-A.

As shown in FIGS. 1-3, the burner 10 has a primary axis 18 defined by the axial direction of the intermediary section 14 and the downstream section 16, which are coaxial. The axial direction of the burner indicates the direction of flow exiting the burner 10. The main fuel conduit 30 has a solid fuel inlet axis 21 that is offset at an angle θ with respect to a primary axis 18. Preferred ranges for the offset angle θ are discussed below. To direct the flow from the angled main fuel conduit 30 into the intermediary section 14, the solid fuel and transport gas mixture flows through an elbow section 28.

The upstream section 12 also includes a central fuel nozzle support rod 40 which is preferably coaxial with the burner axis 18, as shown in FIGS. 1-3. The fuel nozzle support rod 40 serves as a hub to provide structural support for other features of the burner, as discussed below.

The intermediary section 14 includes an outer fuel conduit 44 surrounding the central fuel nozzle support rod 40. An annular passage 46 is formed between an outer surface of the central fuel nozzle support rod 40 and an inner surface of the outer fuel conduit 44. The annular passage 46 is fluidly connected to the elbow section 28 so that the solid fuel and transport gas mixture is directed to flow through the annular passage 46. A tapered section 13 may be provided to transition the flow from the elbow section 28 to the annular passage 46.

An oxygen conduit 50 surrounds the outer fuel conduit 44 in the intermediate section 14 to form an annular oxygen passage 54 bounded by an outer surface of the outer fuel conduit 44 and an inner surface of the oxygen conduit 50. The oxygen conduit 50 has an oxygen inlet 52, and terminates at a downstream end 56.

Figure 4:
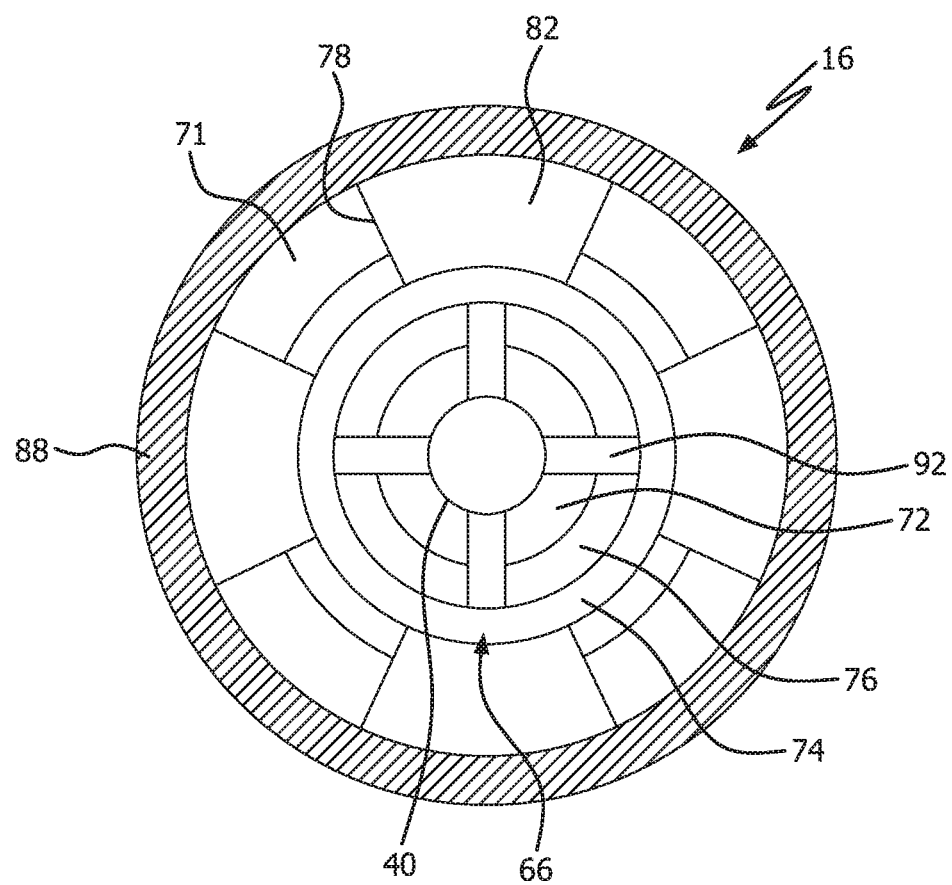
FIG. 4 is a front end view of the burner embodiment shown in FIG. 1, as seen from view B-B.

The intermediary section 14 connects to the downstream section 16, either directly or through a transition section 15. The central fuel nozzle support rod 40 extends continuously through the intermediary section 14 and into and through at least a portion of the downstream section 16. The outer fuel conduit 44 transitions to a thinner-walled outer fuel conduit 45, resulting in an annular flow passage 47 in the downstream section 16 that is of larger cross-sectional area than the annular passage 46 in the intermediary section 14. An expanded view of the downstream section 16 is shown in FIG. 5, and a downstream end view of the downstream section 16 is shown in FIG. 4.

The downstream section 16 may include a fuel trip disk 68 or similarly configured obstruction extending radially outward from fuel nozzle support rod 40. The fuel trip disk 68 has a radial height H1 measured from the outer surface of the fuel nozzle support rod 40.

Figure 5:
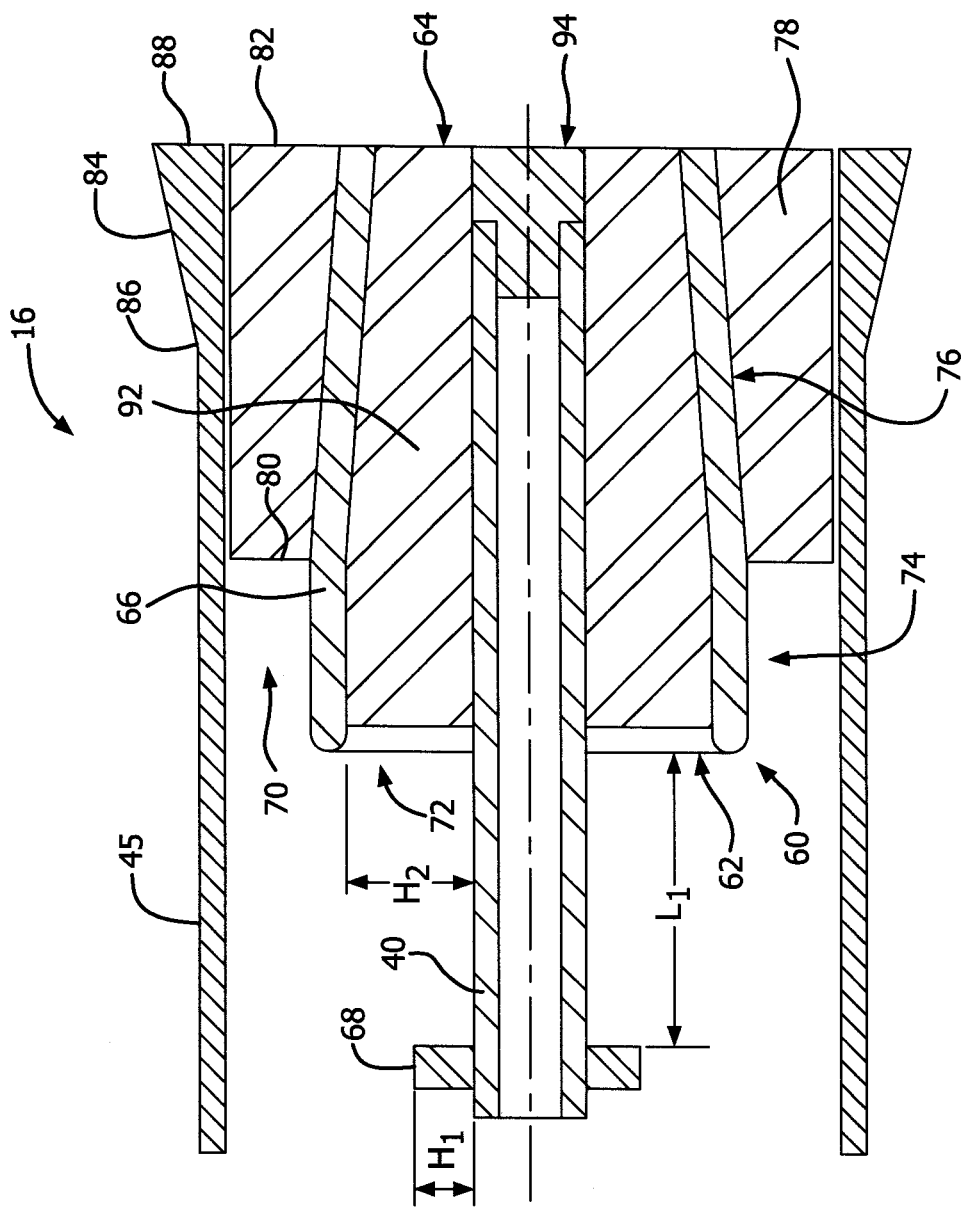
FIG. 5 is a close-up detailed cross-sectional view of the outlet end of the burner embodiment of FIGS. 1-4.
Figure 6:
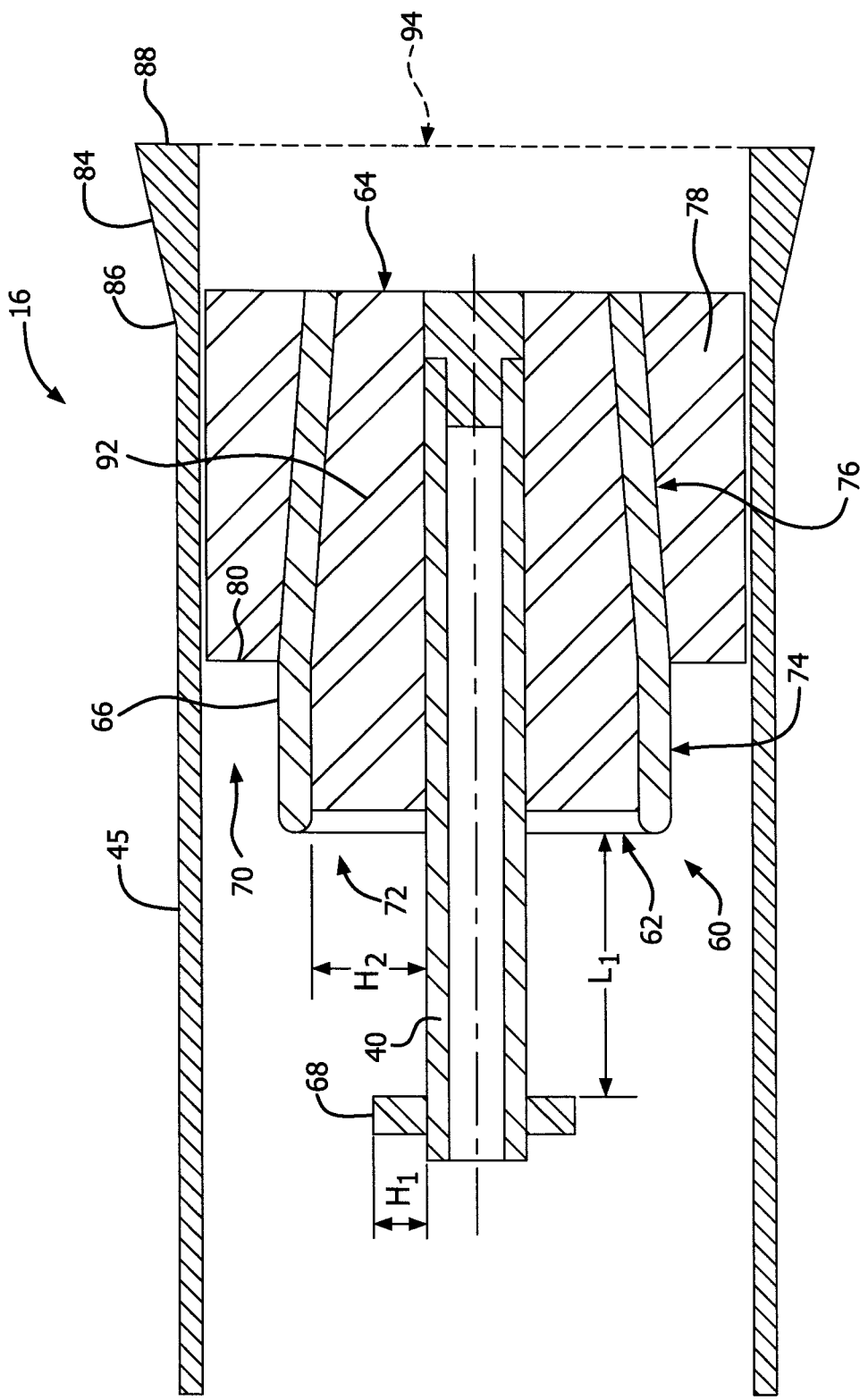
FIG. 6 is another embodiment of the outlet end of the burner of FIGS. 1-4.

The downstream section 16 includes a fuel separator 60 spanning between an inlet plane 62 and an outlet plane 64, which in FIG. 5 is also the outlet plane 94 of the burner 10. It is not necessary, however, that the outlet plane 64 of the fuel separator 60 and the outlet plane 94 of the burner 18 be coincident. For example, in the embodiment shown in FIG. 6, the outlet plane 64 of the fuel separator 60 is located upstream of the outlet plane 94 of the burner 18. The fuel separator 60 includes a tubular element 66 positioned surrounding the fuel nozzle support rod 40 and surrounded by the outer fuel conduit 45. The tubular element 66 may include a generally cylindrical upstream portion 74 followed by a converging generally truncated conical downstream portion 76, or the entire tubular element 66 may have either a generally cylindrical shape or a converging generally truncated conical shape. An inner annular nozzle 72 is formed between the fuel nozzle support rod 40 and the tubular element 66, while an outer annular nozzle 70 is formed between the tubular element and the outer fuel conduit 45.

The inlet plane 62 of the fuel separator 60 is positioned at a distance L1 downstream from a downstream face 69 of the fuel trip disk 68. The opening of the inner nozzle 72 at the inlet plane 62 has a height H2 measured from the outer surface of the fuel nozzle support rod to the inner surface of the tubular element 66.

Guide vanes 92 are positioned in the inner nozzle 72 between the tubular element 66 and the fuel nozzle support rod 40. At least two guide vanes 92 may be used, and in the depicted embodiment four guide vanes 92 are used. The guide vanes 92 may be oriented axially or they may be oriented at an angle to the axial flow direction to promote swirl.

Figure 11:
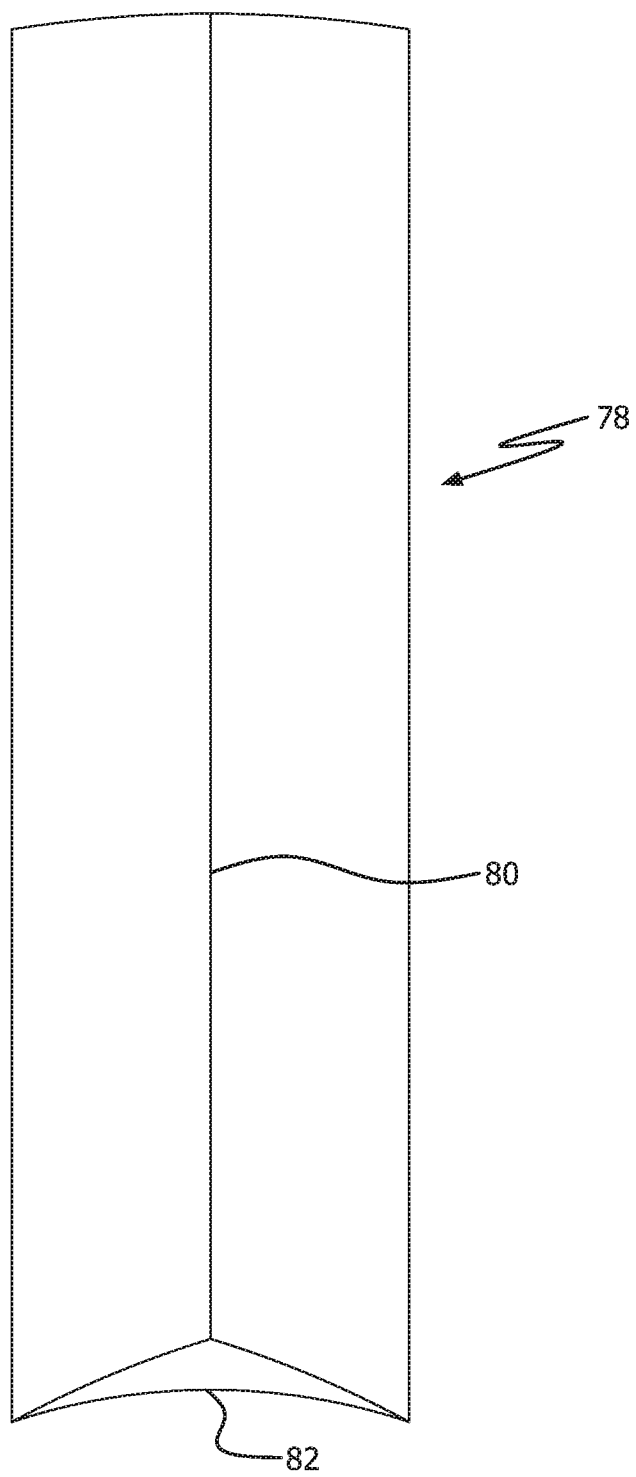
FIG. 11 is a front end view of a fuel wedge for use in an outer nozzle of a burner as in FIG. 1.

Wedges 78 are positioned in the outer nozzle 70 between the tubular element 66 and the outer fuel conduit 45, and a discharge passage 71 is formed between each adjacent pair of wedges 78. The wedges 78 have a leading apex 80 and a trailing base 82 (see FIG. 11) and a circumferential spread angle from about 10° to about 60°. At least two wedges 78 and no more than six wedges 78 are used, and in the depicted embodiment four wedges 78 are used, and the number of discharge passages 71 is equal to the number of wedges 78.

Figure 7:
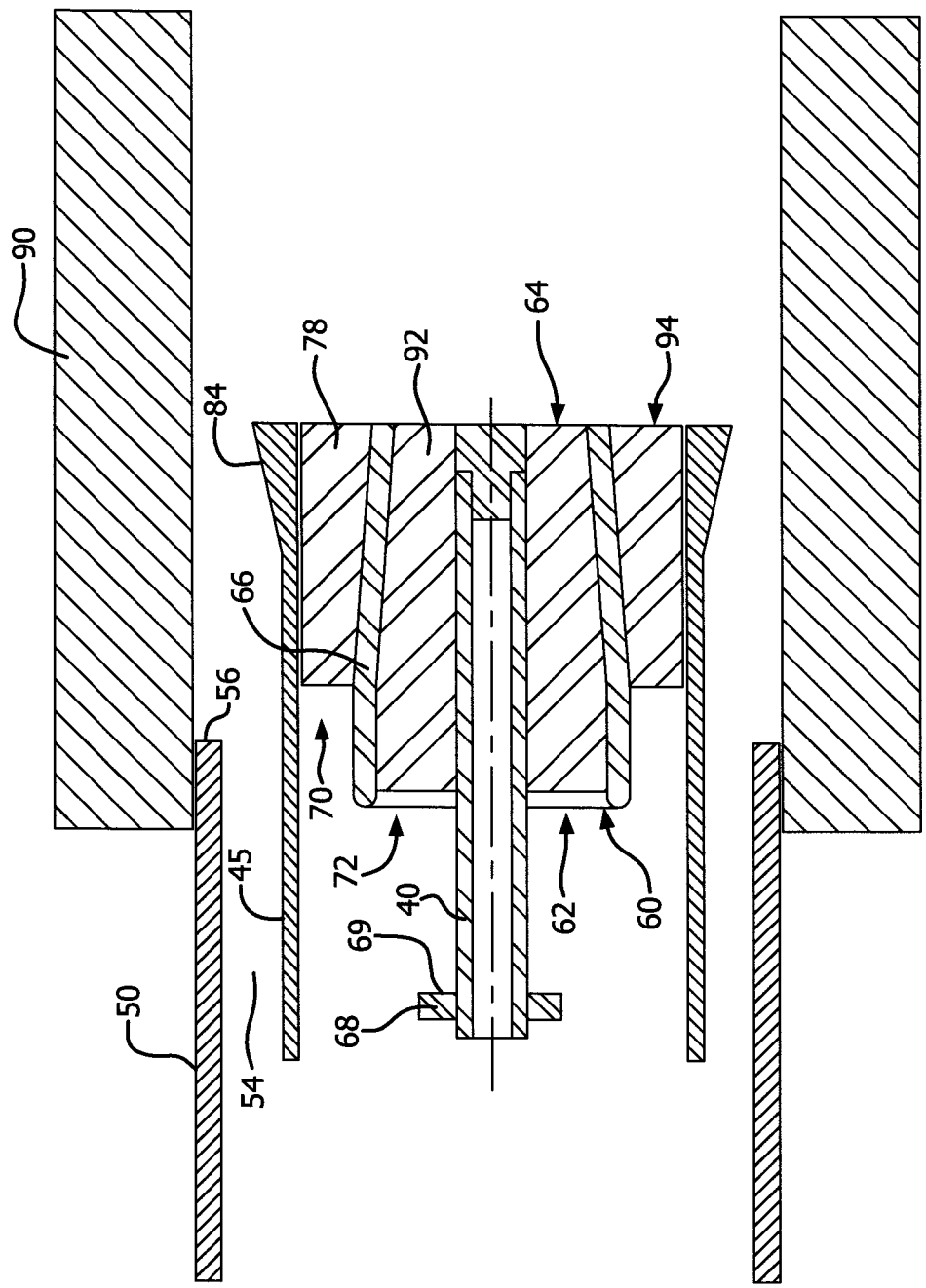
FIG. 7 is a cross-sectional view of the outlet end of the burner embodiment of FIG. 5 inserted into a pre-combustor.

As shown in FIG. 7, when the burner 10 is installed into a precombustor 90, after the downstream end 56 of the oxygen conduit 50 terminates, an annular oxygen conduit is formed between the outer surface of the outer fuel conduit 45 and an inner surface of the precombustor 90. A plurality of wedges 84, or one annular wedge 84, may be positioned on the outer surface of the outer fuel conduit 45 at the outlet plane 64 of the fuel separator 60, the wedge 84 having an upstream apex 86 and a downstream base 88, and a spread angle from about 5° to about 30°. The wedge(s) 84 may circumscribe all, or only a portion or portions of, the outer fuel conduit 45.

In operation, solid fuel and transport gas enter the burner 10 through the solid fuel conduit 20 at a velocity of greater than or equal to nominally 15 m/sec. In burner embodiments utilizing supplemental transport gas, the solid fuel conduit 20 terminates in the plenum 26 surrounded by the supplemental transport gas. Supplemental transport gas can be employed to increase the fuel transport velocity through the burner 10 with a much lower pressure drop than would be incurred by increasing the (primary) transport gas flow rate by an equal amount.

Figure 8:
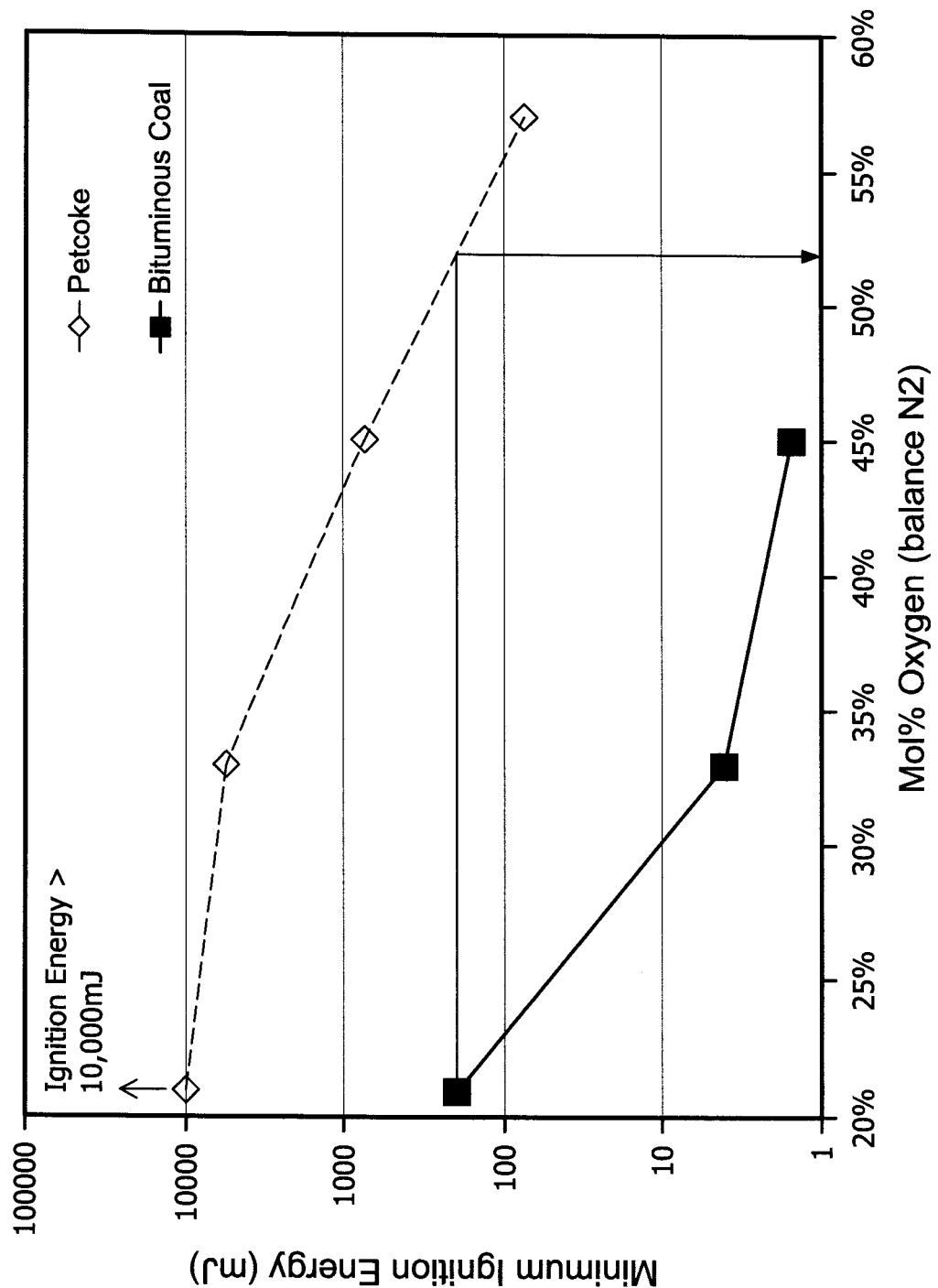
FIG. 8 is a plot of minimum ignition energy versus oxygen concentration for bituminous coal and petroleum coke.

The supplemental transport gas can also be used to introduce oxygen to increase the oxidizer content of the transport gas stream. This can be a convenient way of improving the ignition characteristics of the solid fuel. FIG. 8, for example, shows the solid fuel ignition energy versus oxidizer concentration for a bituminous coal and petroleum coke whose relevant properties are given in Table 1.

TABLE 1

| Fuel | Bituminous Coal | Petroleum Coke |
|---|---|---|
| Volatile Matter | 38.78 wt % | 9.85 wt % |
| Fixed Carbon | 51.96 wt % | 89.46 wt % |
| Moisture | 1.01 wt % | 0.33 wt % |
| Ash | 8.25 wt % | 0.36 wt % |
| Higher Heating Value | 13,777 Btu/lb | 15,456 Btu/lb |
| Particle Size Distribution | 100% < 75 microns | 100% < 75 microns |

Note that for 21 mol % oxygen concentration, the minimum ignition energy of petroleum coke (or pet coke) is two orders of magnitude greater than for bituminous coal, which is indicative of the substantial ignition delay that is prone to occur when igniting an air/pet coke mixture in a flowing stream, and is principally due to the very low volatile matter content of pet coke. Moreover, the data show that increasing the transport gas oxygen concentration by even a small amount over that of air substantially reduces the minimum ignition energy, and thereby renders the pet coke stream less difficult to ignite and stably combust. In fact, the data of FIG. 8 indicate that the addition of oxygen to a pet coke/transport gas stream, via supplemental oxygen in the transport gas, in an amount yielding a composite oxygen concentration less than or equal to nominally 52 mol %, generates a gas plus pet coke mixture with a minimum ignition energy greater than or equal to that of air plus bituminous coal. For safety reasons, it is advisable not to enrich the transport gas stream with oxygen to a level that yields a lower minimum ignition energy that an air/bituminous coal stream. Thus, for example, with petroleum coke combustion, the inventive burner can operate with supplemental transport oxygen in an amount that raises the oxygen content of the transport gas to no more than approximately 50 mol %, while in a preferred embodiment, the oxygen content of the transport gas can be as high as about 35 mol %.

Experiments have shown that orienting the solid fuel conduit 20 and main fuel conduit 30 at an angle, θ, of less than about 65 degrees from the axis 18 of the burner results in a lower degree of fuel flow pulsation at the outlet of the burner fuel nozzle than if the angle, θ, is greater than about 65 degrees. It has further been found that an orientation angle, θ, of the fuel intake pipe between approximately 30 and 60 degrees provides a good balance of low pulsation plus sufficient impact with the wall of the fuel intake pipe to provide satisfactory fuel dispersion within the annular fuel flow passage 46.

Fuel flow exiting the annular passage 46 of the intermediary section 14 undergoes an expansion to the larger cross-sectional area of the annular passage 47 in the downstream section 16. The function of the fuel separator 60, positioned within the downstream section 16, is to divide the oncoming fuel stream into separate fractions to flow through the inner annular nozzle 72 and the outer annular nozzle passage 70. While the burner 10 can function satisfactorily with various positions and geometries of the fuel separator 60, an optimal combination of ease of ignition, flame stability, and flame shape has been achieved when the average velocity of the fuel fraction exiting the outer nozzle 70 is less than the average velocity of the fuel fraction exiting the inner nozzle 72. In particular, in one embodiment of the burner 10, the ratio of cross-sectional area of the outer nozzle 70 to the inner nozzle 70 is greater than 1.0, as measured at the outlet plane 64 of the fuel separator 60. Preferably, the ratio of the cross-sectional areas of the outer nozzle 70 to the inner nozzle 72 at the fuel separator outlet plane 64 is from about 1.5 to about 6.0, since this range has been determined to yield an optimal combination of outer and inner nozzle fuel velocity, leading to a stable flame with high combustion efficiency.

To further facilitate the fuel split between the inner nozzle 72 and outer nozzle 70, the fuel trip disk 68 may be positioned within the downstream section 16 of the fuel flow passage 47, but upstream of the upstream edge 62 of the fuel separator 60, along the burner axis 18. The height H1 of the trip disk 68 is optimally from about 0.2 to 0.5 of the height H2 of the inner nozzle 72. A height, H1 of the trip disk less than about 0.2 times the height H2 of the inner nozzle will have negligible effect on the solid fuel flow distribution, while a height H1 greater than about 0.5 times the height H2 will bias too much of the fuel flow to the outer nozzle and increases the risk of fuel particles dropping out of suspension. Further, for the trip disk 68 to function optimally, the longitudinal distance L1 from the downstream face 69 of the fuel trip disk 68 to the fuel separator inlet plane 62 should be from about 1 to about 10 times the radial height H1 of the disk 68. A longitudinal distance, L1 less than about 1 times the radial height H1 of the trip disk will bias too much of the fuel flow to the outer nozzle and increases the risk of fuel particles dropping out of suspension, while a longitudinal distance greater than about 10 times the radial height of the disk will have negligible effect on the solid fuel flow distribution. Preferably, the longitudinal distance L1 is from about 2 to about 5 times the radial height H1 of the disk 68.

It is desirable in certain circumstances, particularly when it is intended to operate the burner 20 with relatively low momentum transport gas exit velocity, to use a fuel separator 60 having the straight section 74 in combination with the downstream convergent section 76, rather than simply a straight (cylindrical) fuel separator 60. Alternatively, the fuel separator 60 may consist of only a truncated convergent section (i.e. without a straight section. The convergent section 76 facilitates an acceleration of the flow in the inner nozzle 72, which augments burner flame stability and flame jet penetration into the combustion space.

The plurality of bluff fuel wedges 78 positioned in the outer nozzle 70 further aids in flame stability. Each fuel wedge 78 generates a low pressure, flow recirculation zone in its wake (i.e., downstream of its base 82). This low pressure region pulls both oxygen and solid fuel into the wake of the wedge 78, and thereby facilitates the mixing of oxygen and solid fuel at low velocity. In other words, the wake generated by each wedge 78 provides, in essence, a flame holder for ignition of the solid fuel stream. By distributing multiple wedges 78 around the periphery of the outer nozzle 7, a distributed ignition source is achieved to aid in burner flame stability. Preferably, the burner 10 includes at least two and no more than six fuel wedges 78.

The at least one bluff oxygen wedge 84 positioned at the outer surface of the outer fuel conduit 45 works in combination with the fuel wedges 78 to further facilitate solid fuel ignition and increase flame stability. Each oxygen wedge 84 causes a radial deflection of oxygen away from the burner axis 18, and in so doing, similarly to the fuel wedge 78, forms a low velocity, low pressure region in its wake. Hence, the oxygen wedges 84 and fuel wedges 78 act in tandem. Although multiple oxygen wedges 84 can be distributed along the circumference of the outer fuel conduit 45, preferably, one continuous annular oxygen wedge 84 is positioned to circumscribe the entire outer fuel conduit 45.

Figure 9:
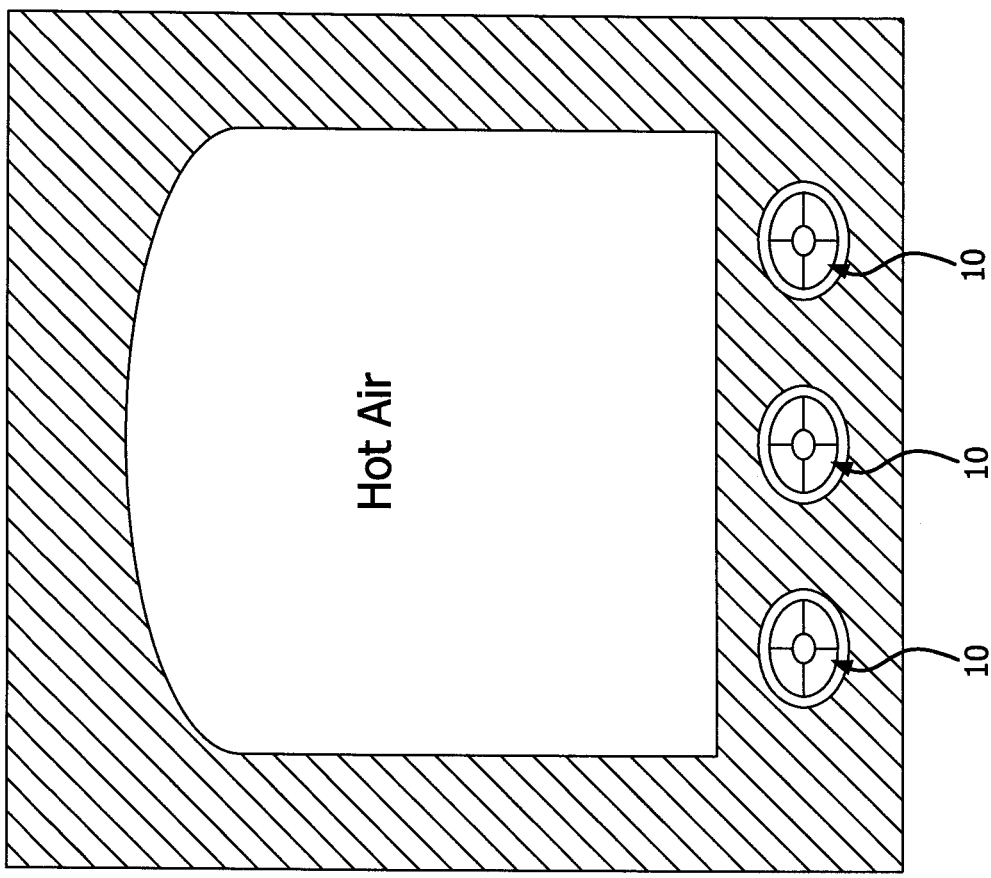
FIG. 9 is a depiction of several of the burners as described herein positioned underneath a hot air port within a regenerative glass furnace.
Figure 10:
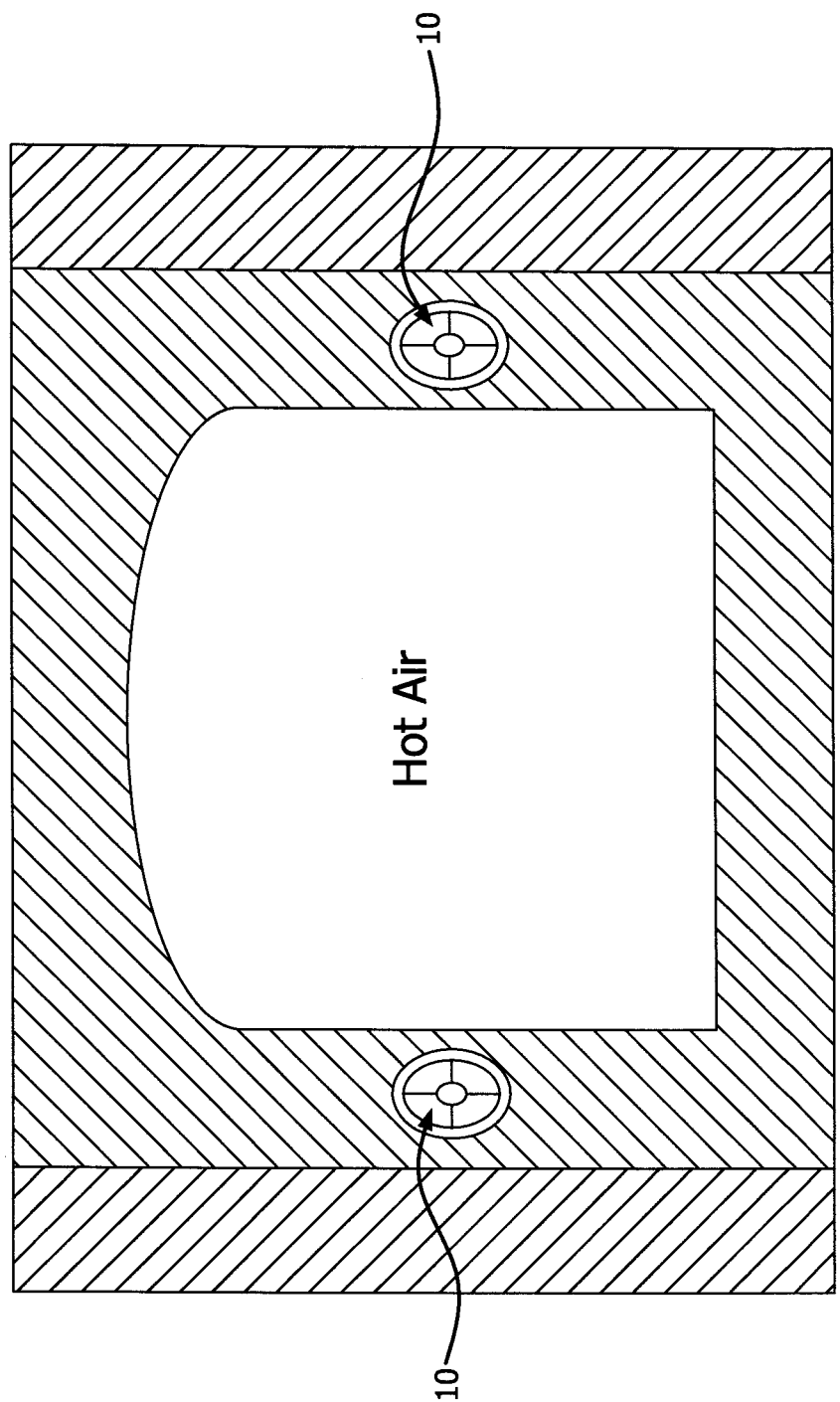
FIG. 10 is a depiction of two of the burners as described herein positioned on the sides of a hot air port within a regenerative glass furnace.

A burner 10 as described herein can be used in a system as a device for heating and/or melting operations in a variety of industrial applications. One application of particular note is as a supplemental heat source in an air-fuel fired regenerative glass melting furnace. Those skilled in the art will understand that in a regenerative air-fuel fired glass melting furnace, hot air enters the furnace combustion zone through large, somewhat rectangular-shaped openings, while fuel is commonly introduced through one or more burner firing ports. FIGS. 9 and 10, for example, illustrate exemplary embodiments wherein one or more burner firing ports are installed near a hot combustion air port (i.e., firing port) in a regenerative glass melting furnace, wherein near means that the burner can be either adjacent to and outside the edge of the port or adjacent to the end and within the port. In these embodiments, solid fuel discharging from the firing port is injected into the hot air stream as it enters the combustion space. FIG. 9 illustrates an exemplary under-port firing arrangement, while FIG. 10 illustrates an exemplary side-port firing arrangement. In these embodiments, the burners can be operated with less than stoichiometric oxygen as a means to enhance the solid fuel combustion with hot combustion air from the regenerator port. In a preferred embodiment, the burners are to be fired with a stoichiometric ratio of between about 0.05 and 0.5. That is, the burners are to be fired with between about 5% and 50% of the theoretical oxidizer required for complete combustion. Operation with a stoichiometric ratio below about 0.05 will lead to unsatisfactory flame stability and low combustion efficiency. On the other hand, operation with a stoichiometric ratio above about 0.5 will be incompatible with operation in an air-fuel fired regenerative glass furnace. This is because it will require either an unacceptably large reduction in air flow rate through the regenerators to maintain overall near-stoichiometric conditions in the furnace; or if air flow rate is not changed, it can lead to excessively high NOx emissions.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. A solid fuel/oxygen burner comprising:
   an upstream section, an intermediary section, and a downstream section;
   a solid fuel conduit extending through the intermediary and downstream sections for transporting a mixture of solid fuel in a transport gas, the solid fuel conduit having a greater cross-sectional area in the downstream section than in the intermediary section;
   a tubular fuel separator positioned within the solid fuel conduit in the downstream section, the fuel separator being bounded by an inlet plane and a outlet plane, the fuel separator dividing the fuel conduit into an inner nozzle having a cross-sectional area and an outer annular nozzle having a cross-sectional area, wherein the ratio of the outer nozzle cross-sectional area to the inner nozzle cross-sectional area measured at the outlet plane is greater than 1; and
   fuel wedges positioned within the outer nozzle spanning from the tubular fuel separator to the solid fuel conduit thereby forming discharge passages between the fuel wedges, each fuel wedge having an upstream apex and expanding circumferentially to a downstream base aligned with the outlet plane of the fuel separator.

2. The burner of claim 1, further comprising an annular oxygen conduit surrounding the solid fuel conduit in at least the intermediary section.

3. The burner of claim 1, further comprising:
   at least one oxygen wedge extending radially outward from the annular solid fuel conduit in the downstream section, the oxygen wedge having an upstream apex and a downstream base aligned with the outlet plane of the fuel separator.

4. The burner of claim 1, further comprising:
   a main fuel conduit in the upstream section of the burner for flowing solid fuel and a primary transport gas to the solid fuel conduit in the intermediary section of the burner;
   wherein the intermediary section and the downstream section are coaxial and define a burner axis.

5. The burner of claim 4, further comprising:
   a tubular solid fuel and primary transport gas conduit extending into and surrounded by the main fuel conduit along the solid fuel inlet axis, the tubular solid fuel and primary transport gas conduit having an inlet for providing solid fuel and the primary transport gas to the burner; and a supplemental transport gas inlet to provide supplemental transport gas to the main fuel conduit.

6. A method of combusting solid fuel and oxygen in the burner of claim 5, comprising:

providing sufficient supplemental transport gas to increase the oxygen concentration of the mixture of solid fuel and transport gas to greater than about 21 mol % and less than or equal to about 50 mol %.

7. The burner of claim 1, wherein the ratio of the outer nozzle cross-sectional area to the inner nozzle cross-sectional area measured at the outlet plane is from about 1.5 to about 6.

8. The burner of claim 1, further comprising:

a fuel trip disk positioned symmetrically about the burner axis and upstream of the inlet plane of the fuel separator by a longitudinal distance, the fuel trip disk having a radial height.

9. The burner of claim 8, wherein the inner annular nozzle formed by the fuel separator has a radial height at the inlet plane, and wherein the radial height of the trip disk is from about 0.2 to about 0.5 times the radial height of the inner annular nozzle.

10. The burner of claim 1, wherein the fuel separator is generally cylindrical in shape.

11. The burner of claim 1, wherein the fuel separator includes a generally cylindrical upstream portion and a generally converging truncated conical downstream portion.

12. A method of operating a regenerative air-fuel glass melting furnace using a burner as in claim 1, the furnace having a hot air port, the method comprising: positioning at least one of the burner near an edge of the hot air port.

13. The method of claim 12, wherein the stoichiometric ratio is from about 0.05 to about 0.5.

14. A regenerative furnace comprising:

a burner block having at least one firing port mounted in a sidewall of the furnace; and one or more solid fuel/oxygen burners positioned near an edge of the at least one firing port, the burner comprising:

an upstream section, an intermediary section, and a downstream section;

a solid fuel conduit extending through the intermediary and downstream sections for transporting a mixture of solid fuel in a transport gas, the solid fuel conduit having a greater cross-sectional area in the downstream section than in the intermediary section; and a tubular fuel separator positioned within the solid fuel conduit in the downstream section, the fuel separator being bounded by an inlet plane and a outlet plane, the fuel separator dividing the fuel conduit into an inner nozzle having a cross-sectional area and an outer annular nozzle having a cross-sectional area, wherein the ratio of the outer nozzle cross-sectional area to the inner nozzle cross-sectional area measured at the outlet plane is greater than 1; and fuel wedges positioned within the outer nozzle spanning from the tubular fuel separator to the solid fuel conduit thereby forming discharge passages between the fuel wedges, each fuel wedge having an upstream apex and expanding circumferentially to a downstream base aligned with the outlet plane of the fuel separator.

* * * * *